(12) United States Patent
Strabley et al.

(10) Patent No.: US 9,030,655 B2
(45) Date of Patent: May 12, 2015

(54) CLOSED LOOP ATOMIC INERTIAL SENSOR

(71) Applicant: Honeywell International Inc., Morristown, NJ (US)

(72) Inventors: Jennifer S. Strabley, Maple Grove, MN (US); Kenneth Salit, Plymouth, MN (US); Mary K. Salit, Plymouth, MN (US); Karl D. Nelson, Plymouth, MN (US); Robert Compton, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/758,370

(22) Filed: Feb. 4, 2013

(65) Prior Publication Data

US 2014/0022534 A1 Jan. 23, 2014

Related U.S. Application Data

(60) Provisional application No. 61/665,061, filed on Jun. 27, 2012.

(51) Int. Cl.
*G01P 21/00* (2006.01)
*G01C 19/58* (2006.01)
(Continued)

(52) U.S. Cl.
CPC .............. *G01P 21/00* (2013.01); *G01C 19/58* (2013.01); *G01C 21/16* (2013.01); *G01P 15/08* (2013.01)

(58) Field of Classification Search
CPC ... G01N 21/64; G01N 21/00; G01N 21/3504; G01N 21/47; G01N 21/55; G01B 11/14; G01P 21/00; G01P 15/08; G01C 19/58; G01C 21/16

USPC ............ 356/72; 73/1.38, 1.37, 1.77; 702/104, 702/141, 96
See application file for complete search history.

(56) References Cited

U.S. PATENT DOCUMENTS 3,761,721 A 9/1973 Altshuler et al.
4,545,242 A * 10/1985 Chan ......................... 73/152.01
(Continued)

FOREIGN PATENT DOCUMENTS

EP 0511119 5/1995
EP 2629303 8/2013
(Continued)

OTHER PUBLICATIONS

"Ground State Laser cooling of trapped atoms using electromagnetically induced transparency" to J. Eschner et al., Laser Spectroscopy XV, World Scientific, Proceedings of the XV International Conference Snowbird, Utah, USA, Jun. 10-15, 2001—(pp. 325-328); retrievable from http://heart-c704.uibk.ac.at/publications/papers/icols01_eit_eschner.pdf.*
(Continued)

*Primary Examiner* — Tarifur Chowdhury
*Assistant Examiner* — Mohamed Amara
(74) *Attorney, Agent, or Firm* — Fogg & Powers LLC

(57) ABSTRACT

An apparatus for inertial sensing is provided. The apparatus comprises at least one atomic inertial sensor, and one or more micro-electrical-mechanical systems (MEMS) inertial sensors operatively coupled to the atomic inertial sensor. The atomic inertial sensor and the MEMS inertial sensors operatively communicate with each other in a closed feedback loop.

19 Claims, 3 Drawing Sheets

(51) Int. Cl.
*G01C 21/16* (2006.01)
*G01P 15/08* (2006.01)

(56) References Cited

U.S. PATENT DOCUMENTS

| | | | |
|---|---|---|---|
| 4,992,656 | A | 2/1991 | Clauser |
| 5,052,808 | A | 10/1991 | Hilby et al. |
| 5,274,231 | A | 12/1993 | Chu et al. |
| 6,456,939 | B1 * | 9/2002 | McCall et al. ............... 701/501 |
| 6,606,908 | B2 | 8/2003 | Johann et al. |
| 6,647,352 | B1 | 11/2003 | Horton |
| 6,697,736 | B2 | 2/2004 | Lin |
| 7,142,983 | B2 | 11/2006 | Huddle |
| 7,728,587 | B2 | 6/2010 | Stewart et al. |
| 7,847,924 | B2 | 12/2010 | Aarons et al. |
| 7,995,630 | B2 * | 8/2011 | Rakuljic ............... 372/29.011 |
| 8,459,093 | B2 | 6/2013 | Donadel et al. |
| 8,583,371 | B1 | 11/2013 | Goodzeit et al. |
| 8,860,933 | B2 | 10/2014 | Compton et al. |
| 2005/0125141 | A1 | 6/2005 | Bye |
| 2006/0249666 | A1 | 11/2006 | Kasevich et al. |
| 2009/0242743 | A1 | 10/2009 | Bouyer et al. |
| 2010/0064767 | A1 | 3/2010 | Rice et al. |
| 2010/0149025 | A1 | 6/2010 | Meyers et al. |
| 2010/0149541 | A1 | 6/2010 | Aarons et al. |
| 2013/0213135 | A1 | 8/2013 | Compton et al. |
| 2013/0270434 | A1 * | 10/2013 | Nelson et al. ............... 250/305 |
| 2014/0016118 | A1 | 1/2014 | Compton et al. |

FOREIGN PATENT DOCUMENTS

| WO | 2007002327 | 1/2007 | |
|---|---|---|---|
| WO | WO 2007002327 A1 * | 1/2007 | ............... G01C 19/58 |

OTHER PUBLICATIONS https://jila.colorado.edu/research/atomic-molecular-physics/ultracold-atoms (Jul. 7, 2014).*

European Patent Office, "Office Action from EP Application No. 13171764.7 mailed Dec. 17, 2013", "from Foreign Counterpart of U.S. Appl. No. 13/758,370", Dec. 17, 2013, pp. 1-7, Published in: EP.

, "Multi-Axis Atomic Inertial Sensor System", "U.S. Appl. No. 13/661,809 filed on Oct. 26, 2012", , pp. 1-20.

Geiger et al., "Detecting inertial effects with airborne matter-wave interferometry", "Nature Communications", Sep. 20, 2011, pp. 1-7.

Young et al., "Precision Atom Interferometry with Ligth Pulses", "at least as early as Dec. 1997", 1997, pp. 1-5, Publisher: Academic Press.

European Patent Office, "European Search Report", "from Foreign Counterpart of U.S. Appl. No. 13/758,370", Nov. 8, 2013, pp. 1-3, Published in: EP.

European Patent Office, "Office Action", "from Foreign Counterpart of U.S. Appl. No. 13/758,309", Jul. 9, 2013, pp. 1-5, Published in: EP.

European Patent Office, "European Search Report", "from Foreign Counterpart of U.S. Appl. No. 13/758,309", May 31, 2013, pp. 1-5, Published in: EP.

Peters et al., "High-Precision Gravity Measurements Using Atom interferometry", "Metrologia", Jun. 2001, pp. 25-61, vol. 38.

Schmidt et al., "A Mobile High-Presicion Absolute Gravimeter Based on Atom Interferometry", "Gyroscopy and Navigation", Apr. 21, 2011, vol. 2, No. 3.

Wu, "Gravity Gradient Survey with a Mobile Atom Interferometer", Mar. 2009, pp. 1-160, Publisher: Xinan Wu.

U.S. Patent and Trademark Office, "Notice of Allowance and Fee(s) Due", U.S. Appl. No. 13/661,809, Aug. 18, 2014, pp. 1-19.

* cited by examiner

CLOSED LOOP ATOMIC INERTIAL SENSOR

This application claims the benefit of priority to U.S. Provisional Application No. 61/665,061, filed on Jun. 27, 2012, which is incorporated by reference.

BACKGROUND

A class of inertial sensors based on atom interferometry use pulses of light to split, and later, recombine the quantum wavefunctions or wavefunction from a sample of cold thermal or quantum degenerate atoms (Bose-Einstein condensate). While split, the phases of the separate parts evolve independently, allowing the accumulation of a phase difference due to the presence of acceleration and/or rotation. When recombined, this phase difference is manifested by changes in the final quantum momentum state or internal state of each atom, or in the quantum degenerate atom cloud as a whole.

For example, one sensor scheme results in changes to the relative populations of two internal states of the atoms. These populations can be detected by, for example, shining resonant light on the atoms and detecting the scattered fluorescence. The relative populations of the two internal states vary sinusoidally as a function of the phase difference induced by inertial forces. The derivative of the relative population with respect to phase difference is approximated by acquiring population measurements at two different phases. At a peak in the relative population sinusoid, the derivative curve crosses zero. Near the zero crossing of the derivative, a small change in phase will induce a large change in the derivative signal. Near a peak of the derivative, however, a small change in phase will induce only a very small change in derivative signal. It is therefore desirable to operate the atomic inertial sensor near a zero crossing or null point of the derivative signal, where sensitivity is maximized.

There are many examples of sensors that are operated near a null point, in order to maximize sensitivity. A common technique to maintain operation near a null point is to provide closed loop feedback. In this technique, the sensor output is compared to zero, or some other desired operating point. The difference between an open loop output and a setpoint is the error signal. The error signal is fed back to a mechanism on the sensor that forces the sensor to shift its output closer to the setpoint.

SUMMARY

An apparatus for inertial sensing is provided. The apparatus comprises at least one atomic inertial sensor, and one or more micro-electrical-mechanical systems (MEMS) inertial sensors operatively coupled to the atomic inertial sensor. The atomic inertial sensor and the MEMS inertial sensors operatively communicate with each other in a closed feedback loop.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
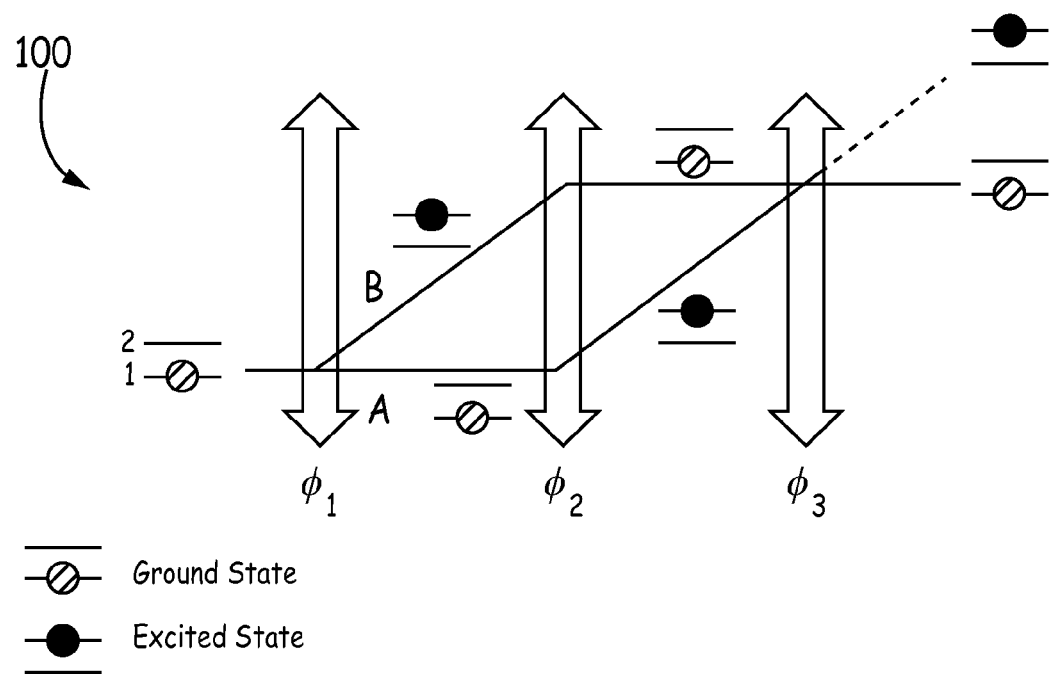
FIG. 1 is a schematic diagram illustrating the ground states and excited states of atoms in a closed loop atomic inertial sensor according to one embodiment.

In the following detailed description, reference is made to the accompanying drawings that form a part hereof, and in which is shown by way of illustration specific illustrative embodiments. It is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

A closed loop atomic inertial sensor is provided. A feedback technique is applied to the atomic inertial sensor to enhance sensor sensitivity. In one approach, phase shifting is employed in a closed loop feedback control to improve the sensitivity of the atomic inertial sensor.

In one example, the relative phase of the final recombination and readout optical pulse is shifted by using a locking circuit that locks to a master laser. The master laser provides a stable reference frequency. Other frequencies are shifted by some variable offset relative to the master laser. The optical frequencies of the slave lasers are shifted until all of the atoms are found in the ground state. This produces a null signal if the detector is tuned to detect the derivative with respect to phase of the excited state population. The amount by which the optical frequency must be tuned in order to maintain the null is used as the output signal, which can be related to a measure of delta rotation or delta velocity.

In one embodiment, direct inputs from MEMS vibratory sensors are used to null the phase readout of an atomic interferometer, enabling closed loop operation.

Several physical mechanisms can be implemented for providing feedback to the atomic inertial sensor. In one embodiment, an external field can be applied to one arm of the interferometer, resulting in a control over the relative phase of the two interferometer arms. In another embodiment, a field gradient can be applied that provides a field differential between the two arms of the interferometer.

In a further embodiment, shifting of the phase of one or more of the optical pulses that are used to recombine and read out the phase of the atomic wavefunctions or wavefunction is employed.

FIG. 1 is a schematic diagram illustrating the ground states and excited states of atoms in a closed loop atomic inertial sensor 100 according to one embodiment, which uses three laser beam pulses. The following equation describes the operation of atomic inertial sensor 100:

$$|c_e|^2 = \frac{1}{2}[1 - \cos(\Delta\phi - \delta\tau/2)]$$

where:

$|c_e|^2$ is the probability of finding the atom in the excited state after recombination;

$\delta$ is the effective detuning of the laser light relative to the atomic transition;

$\tau$ is the duration of an optical $\pi$ pulse; and $$\Delta\phi = \phi_1 - 2\phi_2 + \phi_3$$

where the $\phi_i$ are the phases of the laser relative to the atoms for each pulse. (See Young et al., *Precision Atom Interferometry with Light Pulses*, Atom Interferometry, P. Berman ed., Academic Press, San Diego, 1997).

The pairs of parallel lines in FIG. 1 labeled A and B represent two possible quantum mechanical states of an atom. The atom begins in state 1. After the first optical pulse, depicted by the double ended arrow ($\phi_1$), the atom is in a superposition of states 1 and 2. State 2 has additional momentum relative to state 1, so half of the quantum wavefunction of the atom begins to move upward relative to the half of the wavefunction that remains in state 1. The parallelogram shows the trajectory of the two halves of the wavefunction as they move apart. After the second optical pulse ($\phi_2$), the states of the upper and lower halves of the wavefunction are reversed. Now the lower half is in state 2, and begins to move upward along the second half of the parallelogram until it eventually rejoins the first half. The final pulse ($\phi_3$) maps the accumulated phase difference onto the atomic state, so that the atom has a probability of ending in either state 1 or state 2, where that probability is proportional to the accumulated phase difference.

In an open loop operation, some fraction of the atoms wind up in the excited state, which provides a measure of accumulated phase difference that is proportional to inertial forces. In a closed loop operation, the feedback shifts the relative phase between the atoms and the optical pulses, which can be used to null the phase shift due to inertial forces.

Fusion of MEMS and Atomic Inertial Sensors

In one embodiment, a fusion of MEMS inertial sensors with one or more atomic inertial sensors is provided for closed loop control of the atomic inertial sensors in an integrated MEMS/atomic inertial sensing system.

Figure 2:
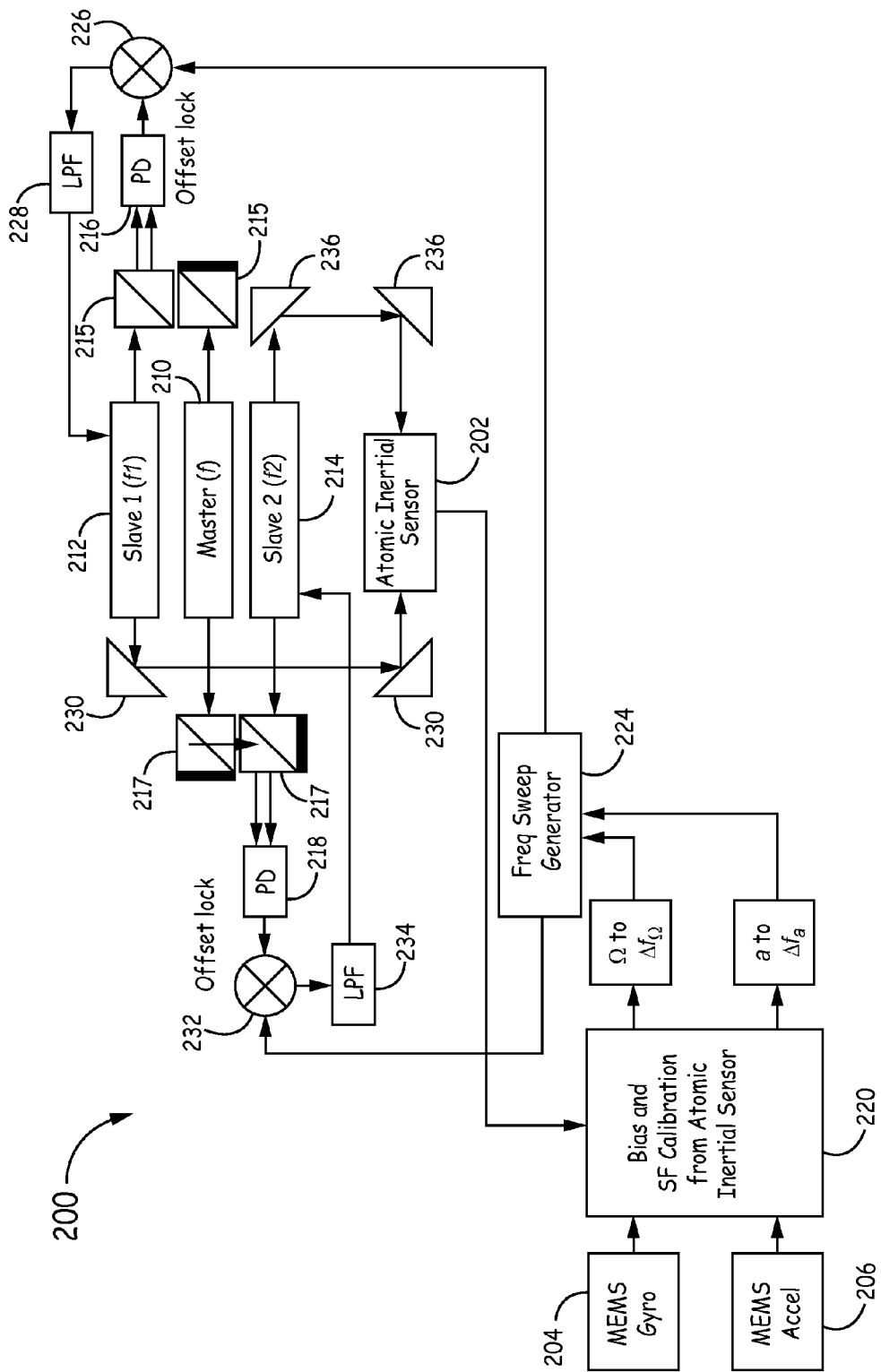
FIG. 2 is a block diagram of an apparatus for inertial sensing that provides closed loop control of an atomic inertial sensor according to one embodiment.

FIG. 2 is a block diagram of an apparatus 200 for inertial sensing that provides closed loop control of an atomic inertial sensor according to one embodiment. The apparatus 200 generally includes at least one atomic inertial sensor 202, and a plurality of micro electrical-mechanical systems (MEMS) inertial sensors, such as a MEMS gyroscope 204 and a MEMS accelerometer 206. The atomic inertial sensor 202 and the MEMS inertial sensors operatively communicate with each other in a closed feedback loop.

The apparatus 200 also includes a plurality of laser devices, including a master laser 210, a first slave laser 212, and a second slave laser 214, which are in optical communication with atomic inertial sensor 202. The master laser 210 is locked to a saturated absorption frequency (f) or an etalon (not shown). The first slave laser 212 has a first shifted frequency (f1), and the second slave laser 214 has a second shifted frequency (f2). In one embodiment, the laser devices can be distributed Bragg reflector (DBR) laser diodes. In another embodiment, the laser devices include a vertical-cavity surface-emitting laser (VCSEL).

A beam from master laser 210 and a beam from slave laser 212 are directed by one or more optical components 215 such that the beams interfere with one another and generate a radio frequency (RF) signal at a first photodetector 216 such as a photodiode (PD). In addition, the beam from master laser 210 and a beam from slave laser 214 are directed by one or more optical components 217 such that the beams interfere with one another and generate an RF signal at a second photodetector 218.

The atomic inertial sensor 202, which exploits fundamental atomic physics to minimize drift, sequentially measures motion with respect to all three coordinate axes by selecting laser beam pairs that are oriented orthogonal (rotation) and parallel (acceleration) to those axes. Further details of an exemplary embodiment of the atomic inertial sensor can be found in U.S. application Ser. No. 13/661,809, entitled MULTI-AXIS ATOMIC INERTIAL SENSOR SYSTEM, the disclosure of which is incorporated by reference.

The MEMS gyroscope 204 and MEMS accelerometer 206 are operatively coupled to a calibration unit 220, which corrects MEMS bias and scale factor (SF) errors based on comparison of atomic data from atomic inertial sensor 202. The calibration unit 220 converts the rotation rate signal ($\Omega$) received from gyroscope 204 into a first frequency offset ($\Delta f_\Omega$), and converts the acceleration signal ($\alpha$) received from accelerometer 206 into a second frequency offset ($\Delta f_\alpha$). The first and second frequency offsets are sent to a frequency sweep generator 224, which sends a frequency sweep signal to a first mixer 226. The mixer 226 also receives the RF signal from photodetector 216. The mixer 226 compares the frequency sweep signal to the RF signal and provides a frequency offset lock signal that is sent to a low pass filter (LPF) 228. The filtered signal from LPF 228 is sent to slave laser 212 to adjust its frequency. The slave laser 212 emits a beam at the adjusted frequency that is directed to an input of atomic inertial sensor 202 by a pair of reflectors 230.

The sweep generator 224 also sends the frequency sweep signal to a second mixer 232, which also receives the RF signal from photodetector 218. The mixer 232 compares the frequency sweep signal to the RF signal from photodetector 218 and provides a frequency offset lock signal that is sent to an LPF 234. The filtered signal from LPF 234 is sent to slave laser 214 to adjust its frequency. The slave laser 214 emits a beam at the adjusted frequency that is directed to an input of atomic inertial sensor 202 by a pair of reflectors 236.

The frequency offsets applied to the slave lasers 212 and 214 are used to null the atomic sensor. The high update rate of the MEMS sensors enables the feedback to the atomic sensor, despite the low update rate of the atomic sensor.

Moving Bragg Lattice for Feedback

Figure 3:
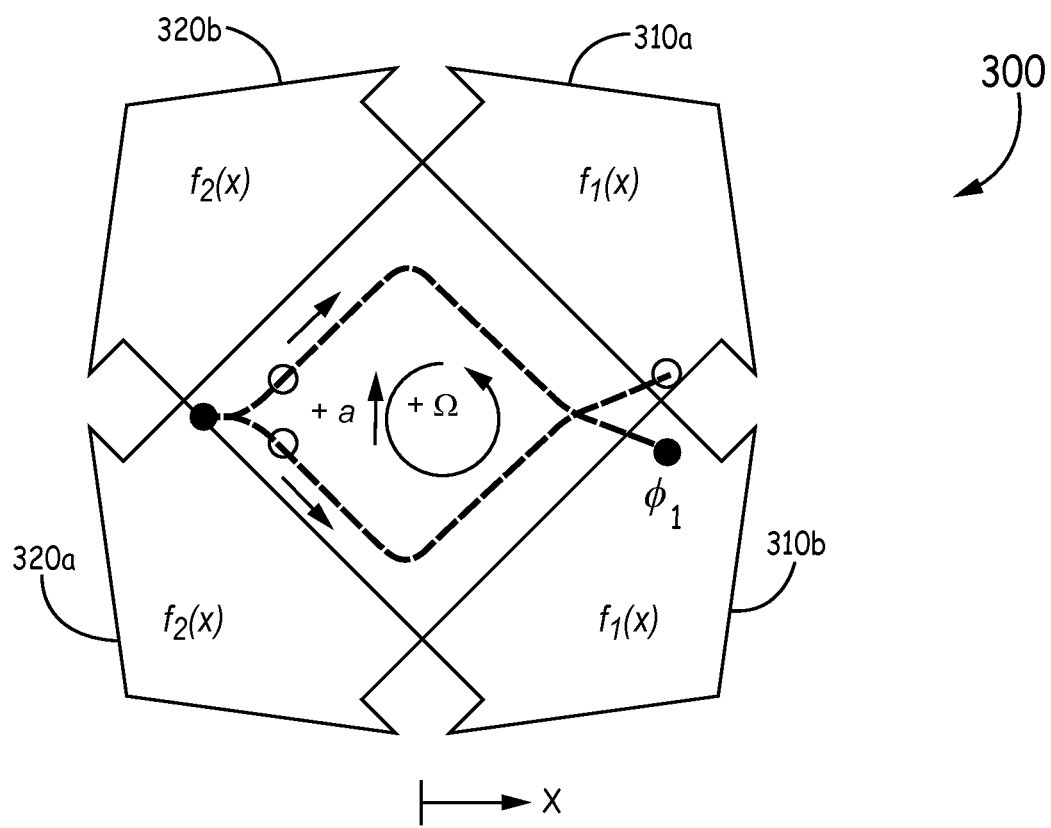
FIG. 3 is a schematic diagram showing interferometer trajectory in a closed loop atomic inertial sensor according to another embodiment.

FIG. 3 shows the interferometer trajectory in a closed loop atomic inertial sensor 300 according to another embodiment. The interferometer in atomic inertial sensor 300 is created by two counter-propagating laser beam pairs that intersect atoms and form a moving two-dimensional (2D) optical lattice that continuously sweeps to provide detuning. Relative detuning depends on location of the atoms. Two pairs of counter-propagating beams 310a, 310b and 320a, 320b intersect atoms in the atomic sensor, with relative laser frequency ($\Delta f$) dependent on atom location x, where x is zero (0) at the center of the trajectory. The atom cloud is split by a Bragg grating, sending the two clouds on diverging paths, moving left to right in the diagram of FIG. 3 and accumulating phase. The atom clouds are then recombined.

The relative laser frequency ($\Delta f$) is the difference between the frequencies of the counter-propagating beams that perform interferometry in the atomic sensor. Detuning changes the sign. Detuning ($\Delta f$) depends on the x coordinate of the atom cloud and is defined by the following equation:

$$\Delta f(x) \equiv f_1(x) - f_2(x) = \frac{\Omega x}{\lambda} + \frac{v}{c} f$$

where:
$\Omega$ is rotation rate measured by the MEMS gyroscope;
$v$ is velocity measured by the MEMS accelerometer;
$c$ is velocity of light;

f is average frequency=$(f_1+f_2)/2=c/\lambda_{eff}$; and
$\lambda_{eff}$ is average wavelength of light.

Example Embodiments

Example 1 includes an apparatus for inertial sensing, the apparatus comprising at least one atomic inertial sensor, and one or more micro-electrical-mechanical systems (MEMS) inertial sensors operatively coupled to the atomic inertial sensor. The atomic inertial sensor and the MEMS inertial sensors operatively communicate with each other in a closed feedback loop.

Example 2 includes the apparatus of Example 1, wherein the atomic inertial sensor comprises an atomic interferometer.

Example 3 includes the apparatus of any of Examples 1-2, wherein the MEMS inertial sensors comprise at least one MEMS gyroscope and at least one MEMS accelerometer.

Example 4 includes the apparatus of any of Examples 1-3, further comprising a plurality of laser devices in optical communication with the atomic inertial sensor.

Example 5 includes the apparatus of Example 4, wherein the laser devices comprise distributed Bragg reflector laser diodes or vertical-cavity surface-emitting lasers.

Example 6 includes the apparatus of any of Examples 4-5, wherein the laser devices comprise a master laser that emits a first beam and a second beam, a first slave laser that emits a first beam and a second beam, and a second slave laser that emits a first beam and a second beam.

Example 7 includes the apparatus of Example 6, further comprising one or more optical components that direct the first beam from the master laser and the first beam from the first slave laser to interfere with one another and generate a first radio frequency signal at a first photodetector.

Example 8 includes the apparatus of any of Examples 6-7, further comprising one or more optical components that direct the second beam from the master laser and the first beam from the second slave laser to interfere with one another and generate a second radio frequency signal at a second photodetector.

Example 9 includes the apparatus of any of Examples 3-8, wherein the MEMS gyroscope and the MEMS accelerometer are each operatively coupled to a calibration unit that corrects for MEMS bias and scale factor errors based on a comparison of atomic data from the atomic inertial sensor.

Example 10 includes the apparatus of Example 9, wherein the calibration unit converts a rotation rate signal received from the MEMS gyroscope into a first frequency offset, and converts an acceleration signal received from the MEMS accelerometer into a second frequency offset.

Example 11 includes the apparatus of Example 10, further comprising a frequency sweep generator that receives the first and second frequency offsets from the calibration unit.

Example 12 includes the apparatus of Example 11, further comprising a first mixer that receives a first frequency sweep signal from the frequency sweep generator and receives the first radio frequency signal from the first photodetector, wherein the first mixer compares the first frequency sweep signal to the first radio frequency signal and generates a frequency offset lock signal that is sent to a first low pass filter.

Example 13 includes the apparatus of Example 12, wherein the first low pass filter sends a filtered signal to the first slave laser to adjust its frequency such that the second beam emitted by the first slave laser is at an adjusted frequency and is directed to a first input of the atomic inertial sensor.

Example 14 includes the apparatus of any of Examples 11-13, further comprising a second mixer that receives a second frequency sweep signal from the frequency sweep generator and receives the second radio frequency signal from the second photodetector, wherein the second mixer compares the second frequency sweep signal to the second radio frequency signal and generates a frequency offset lock signal that is sent to a second low pass filter.

Example 15 includes the apparatus of Example 14, wherein the second low pass filter sends a filtered signal to the second slave laser to adjust its frequency such that the second beam emitted by the second slave laser is at an adjusted frequency and is directed to a second input of the atomic inertial sensor.

Example 16 includes a method for inertial sensing that comprises providing an inertial sensing apparatus comprising at least one atomic inertial sensor, and a plurality of MEMS inertial sensors in operative communication with the atomic inertial sensor, the MEMS inertial sensors comprising at least one MEMS gyroscope and at least one MEMS accelerometer, wherein the atomic inertial sensor and the MEMS inertial sensors operatively communicate with each other in a closed feedback loop. The method further comprises directing a first beam from a master laser and a first beam from a first slave laser to interfere with one another and generate a first radio frequency signal; directing a second beam from the master laser and a first beam from a second slave laser to interfere with one another and generate a second radio frequency signal; converting a rotation rate signal received from the MEMS gyroscope into a first frequency offset; converting an acceleration signal received from the MEMS accelerometer into a second frequency offset; generating a frequency sweep signal from the first and second frequency offsets; comparing the frequency sweep signal to the first radio frequency signal to generate a first frequency offset lock signal; comparing the frequency sweep signal to the second radio frequency signal to generate a second frequency offset lock signal; sending the first frequency offset lock signal to the first slave laser to adjust its frequency such that the first slave laser emits a second beam at an adjusted frequency that is directed to the atomic inertial sensor; and sending the second frequency offset lock signal to the second slave laser to adjust its frequency such that the second slave laser emits a second beam at an adjusted frequency that is directed to the atomic inertial sensor.

Example 17 includes the method of Example 16, wherein the atomic inertial sensor comprises an atomic interferometer.

Example 18 includes the method of any of Examples 16-17, further comprising correcting outputs of the MEMS gyroscope and MEMS accelerometer for MEMS bias and scale factor errors based on a comparison of atomic data from the atomic inertial sensor.

Example 19 includes an inertial sensing apparatus that comprises at least one atomic inertial sensor comprising an atomic interferometer, a plurality of MEMS inertial sensors in operative communication with the atomic inertial sensor, the MEMS inertial sensors comprising at least one MEMS gyroscope and at least one MEMS accelerometer, and a plurality of laser devices in optical communication with the atomic inertial sensor. The atomic inertial sensor and the MEMS inertial sensors operatively communicate with each other in a closed feedback loop.

Example 20 includes the apparatus of Example 19, further comprising a calibration unit operatively coupled to the MEMS gyroscope and the MEMS accelerometer, the calibration unit configured to correct for MEMS bias and scale factor errors based on a comparison of atomic data from the atomic inertial sensor.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An apparatus for inertial sensing, the apparatus comprising:
   at least one atomic inertial sensor; and
   one or more micro-electrical-mechanical systems (MEMS) inertial sensors operatively coupled to the at least one atomic inertial sensor through a calibration unit;
   a plurality of laser devices in optical communication with the at least one atomic inertial sensor and configured to generate optical pulses that are directed to the at least one atomic inertial sensor;
   wherein the calibration unit receives output signals from the at least one atomic inertial sensor and the one or more MEMS inertial sensors, and the at least one atomic inertial sensor receives output signals from the calibration unit, such that the at least one atomic inertial sensor and the MEMS inertial sensors operatively communicate with each other in a closed feedback loop;
   wherein the output signals from the calibration unit are used to shift a relative phase between atoms and the optical pulses from the laser devices in the at least one atomic inertial sensor, the optical pulses from the laser devices each having frequencies that are shifted until the at least one atomic inertial sensor has substantially all of its atoms returned to their initial phase, the initial phase being mapped by a final laser pulse onto a distribution of atoms within a ground state hyperfine manifold.

2. The apparatus of claim 1, wherein the at least one atomic inertial sensor comprises an atomic interferometer.

3. The apparatus of claim 1, wherein the MEMS inertial sensors comprise at least one MEMS gyroscope and at least one MEMS accelerometer.

4. The apparatus of claim 1, wherein the laser devices comprise distributed Bragg reflector laser diodes or vertical-cavity surface-emitting lasers.

5. The apparatus of claim 1, wherein the laser devices comprise:
   a master laser that emits at least one beam that establishes a reference frequency;
   a first slave laser, offset in frequency a first amount from the reference frequency, that emits a first beam and a second beam; and
   a second slave laser, offset in frequency a second amount from the reference frequency, that emits a first beam and a second beam.

6. The apparatus of claim 5, further comprising one or more optical components that direct the beam from the master laser and the first beam from the first slave laser to interfere with one another and generate a first radio frequency signal at a first photodetector.

7. The apparatus of claim 6, further comprising one or more optical components that direct the beam from the master laser and the first beam from the second slave laser to interfere with one another and generate a second radio frequency signal at a second photodetector.

8. The apparatus of claim 7, wherein the MEMS gyroscope and the MEMS accelerometer are each operatively coupled to the calibration unit, which corrects for MEMS bias and scale factor errors based on a comparison of atomic data from the output signals of the at least one atomic inertial sensor.

9. The apparatus of claim 8, wherein the calibration unit converts a rotation rate signal received from the MEMS gyroscope into a first frequency offset, and converts an acceleration signal received from the MEMS accelerometer into a second frequency offset.

10. The apparatus of claim 9, further comprising a frequency sweep generator that receives the first and second frequency offsets from the calibration unit.

11. The apparatus of claim 10, further comprising a first mixer that receives a first frequency sweep signal from the frequency sweep generator and receives the first radio frequency signal from the first photodetector, wherein the first mixer compares the first frequency sweep signal to the first radio frequency signal and generates a frequency offset lock signal that is sent to a first low pass filter.

12. The apparatus of claim 11, wherein the first low pass filter sends a filtered signal to the first slave laser to adjust its frequency such that the second beam emitted by the first slave laser is at an adjusted frequency and is directed to a first input of the at least one atomic inertial sensor.

13. The apparatus of claim 12, further comprising a second mixer that receives a second frequency sweep signal from the frequency sweep generator and receives the second radio frequency signal from the second photodetector, wherein the second mixer compares the second frequency sweep signal to the second radio frequency signal and generates a frequency offset lock signal that is sent to a second low pass filter.

14. The apparatus of claim 13, wherein the second low pass filter sends a filtered signal to the second slave laser to adjust its frequency such that the second beam emitted by the second slave laser is at an adjusted frequency and is directed to a second input of the at least one atomic inertial sensor.

15. A method for inertial sensing, the method comprising:
   providing an inertial sensing apparatus comprising:
      at least one atomic inertial sensor;
      a plurality of micro-electrical-mechanical systems (MEMS) inertial sensors in operative communication with the at least one atomic inertial sensor through a calibration unit, wherein the MEMS inertial sensors comprise at least one MEMS gyroscope and at least one MEMS accelerometer;
      a master laser that emits a first beam and a second beam that establish a reference frequency;
      a first slave laser, offset in frequency a first amount from the reference frequency, that emits a first beam and a second beam; and
      a second slave laser, offset in frequency a second amount from the reference frequency, that emits a first beam and a second beam;
      wherein the calibration unit receives output signals from the at least one atomic inertial sensor and the MEMS inertial sensors, and the at least one atomic inertial sensor receives output signals from the calibration unit, such that the at least one atomic inertial sensor and the MEMS inertial sensors operatively communicate with each other in a closed feedback loop;
   directing the first beam from the master laser and the first beam from the first slave laser to interfere with one another and generate a first radio frequency signal at a first photodetector;
   directing the second beam from the master laser and the first beam from the second slave laser to interfere with one another and generate a second radio frequency signal at a second photodetector;
   converting a rotation rate signal received from the MEMS gyroscope into a first frequency offset;
   converting an acceleration signal received from the MEMS accelerometer into a second frequency offset;

generating a frequency sweep signal from the first and second frequency offsets;
comparing the frequency sweep signal to the first radio frequency signal to generate a first frequency offset lock signal;
comparing the frequency sweep signal to the second radio frequency signal to generate a second frequency offset lock signal;
sending the first frequency offset lock signal to the first slave laser to adjust its frequency such that the first slave laser emits a second beam at an adjusted frequency that is directed to the at least one atomic inertial sensor; and
sending the second frequency offset lock signal to the second slave laser to adjust its frequency such that the second slave laser emits a second beam at an adjusted frequency that is directed to the at least one atomic inertial sensor;
wherein the adjusted frequency of the first slave laser and the adjusted frequency of the second laser result in the at least one atomic inertial sensor having substantially all of its atoms returned to their initial phase, the initial phase being mapped by a final laser pulse onto a distribution of atoms within a ground state hyperfine manifold.

16. The method of claim 15, wherein the at least one atomic inertial sensor comprises an atomic interferometer.

17. The method of claim 15, further comprising correcting outputs of the MEMS gyroscope and MEMS accelerometer for MEMS bias and scale factor errors based on a comparison of atomic data from the at least one atomic inertial sensor.

18. An inertial sensing apparatus comprising:
at least one atomic inertial sensor comprising an atomic interferometer;
a plurality of micro-electrical-mechanical systems (MEMS) inertial sensors in operative communication with the at least one atomic inertial sensor through a calibration unit, wherein the MEMS inertial sensors comprise at least one MEMS gyroscope and at least one MEMS accelerometer; and
a plurality of laser devices in optical communication with the at least one atomic inertial sensor and configured to generate optical pulses that are directed to the at least one atomic inertial sensor;
wherein the calibration unit receives output signals from the at least one atomic inertial sensor and the MEMS inertial sensors, and the at least one atomic inertial sensor receives output signals from the calibration unit, such that the at least one atomic inertial sensor and the MEMS inertial sensors operatively communicate with each other in a closed feedback loop;
wherein the output signals from the calibration unit are used to shift a relative phase between atoms and the optical pulses from the laser devices in the at least one atomic inertial sensor, the optical pulses from the laser devices each have frequencies that are shifted until the at least one atomic inertial sensor has substantially all of its atoms returned to their initial phase, the initial phase being mapped by a final laser pulse onto a distribution of atoms within a ground state hyperfine manifold.

19. The apparatus of claim 18, wherein the calibration unit is operatively coupled to the at least one MEMS gyroscope and the at least one MEMS accelerometer, the calibration unit configured to correct for MEMS bias and scale factor errors based on a comparison of atomic data from the at least one atomic inertial sensor.

* * * * *